(12) United States Patent
Descombes (10) Patent No.: US 6,377,429 B1
(45) Date of Patent: Apr. 23, 2002

(54) PROTECTIVE CIRCUIT FOR BATTERY

(75) Inventor: Arthur Descombes, Kerzers (CH)

(73) Assignee: EM Microelectronic-Marin SA, Marin (CH)

(*) Notice: Subject to any disclaimer, the term of this patent is extended or adjusted under 35 U.S.C. 154(b) by 0 days.

(21) Appl. No.: 09/552,719

(22) Filed: Apr. 19, 2000

(30) Foreign Application Priority Data

Apr. 21, 1999 (CH) .............................. 0727/99

(51) Int. Cl.⁷ .............................. H02H 5/04; H02H 3/00
(52) U.S. Cl. ..................... 361/93.8; 361/93.2; 361/103; 320/134
(58) Field of Search .............................. 361/18, 88, 79, 361/90, 93.1, 93.7, 93.9, 103, 91.4, 91.5; 320/137, 150, 136, 152, 134, 135

(56) References Cited

U.S. PATENT DOCUMENTS

| 4,370,606 A | * | 1/1983 | Kakumoto et al. ......... 320/141 |
| 5,057,779 A | | 10/1991 | Mittel |
| 5,204,611 A | * | 4/1993 | Nor et al. ..................... 320/21 |
| 5,365,129 A | * | 11/1994 | Slemmer et al. .............. 327/65 |
| 5,501,517 A | | 3/1996 | Kiuchi |
| 5,689,209 A | | 11/1997 | Williams et al. |
| 6,014,030 A | * | 1/2000 | Smith et al. ................. 324/705 |

FOREIGN PATENT DOCUMENTS

| EP | 274 995 | 7/1988 |
| EP | 626 582 | 11/1994 |

* cited by examiner

*Primary Examiner*—Kim Huynh
(74) *Attorney, Agent, or Firm*—Sughrue Mion, PLLC (57) ABSTRACT

The invention concerns a protective circuit (10) for protecting a rechargeable battery (1) against currents of too high intensity. The protective circuit (10) includes detection and comparison means (30, 31, 32) for generating a control signal (OVRC) in response to the comparison of a reference voltage ($V_{REF}$) and a measuring voltage ($V_M$) representative of the charge or discharge current ($I_{CH}$, $I_{DCH}$) passing through the battery (1). According to the invention, the detection and comparison means (30, 31, 32) include adjustment means (32) for compensating a temperature dependence of the measuring voltage ($V_M$) and/or the reference voltage ($V_{REF}$), these adjustment means (32) including means for generating diode voltages ($V_{BE1}$ to $V_{BE5}$).

15 Claims, 5 Drawing Sheets

PROTECTIVE CIRCUIT FOR BATTERY

BACKGROUND OF THE INVENTION

The present invention relates to a protective circuit for a battery, and more particularly a protective circuit for a battery adapted to protect a battery against too high charge or discharge currents.

In the rechargeable battery field, protective circuits for batteries are known by means of which battery overcharge, which is undesirable for safety reasons, can be avoided. Protective circuits for batteries by means of which over-discharging of the battery can also be avoided are also known. Indeed, particularly in the case of Li-ion (Lithium-ion) batteries, it may be desirable to avoid such over-discharging of the battery which would have the effect of shortening its lifetime. Typically, such circuits are adapted to measure the voltage across the terminals of the battery and interrupt the charging or discharging thereof in response to a signal indicating that the voltage is greater than or less than a predetermined limit.

In addition to the protective functions against overcharging or over-discharging, protective battery circuits are typically also adapted to protect the battery, during normal operation, i.e. when the battery is neither overcharged nor excessively discharged, against too high charge or discharge currents. One then speaks commonly of overcurrents.

A protective battery circuit of this type typically includes current interruption means connected in series with the battery so that when a load or a charger are connected to the terminals of the battery and the interruption means, a discharge or respectively a charge current, of the opposite direction, flows through the battery and the current interruption means. The current interruption means consequently have to be adapted to conduct and, if necessary, interrupt the current in a bi-directional manner, i.e. both during charging and discharging of the battery.

The making of the current interruption means typically involves using MOS transistors whose conduction can easily be controlled by means of their gate. In particular, a first solution consists in using two power MOSFET transistors connected in anti-series, i.e. source to source or alternatively, drain to drain. Thus, when an overcharge condition is detected, one of the transistors is switched off in order to interrupt the flow of the charge current. Similarly, when an over-discharge condition is detected, the other transistor is switched off in order to interrupt the flow of the discharge current. It will be noted that when one or other of the transistors is switched off, the flow of a current in the opposite direction is nonetheless allowed, since all power transistors have a parasitic diode formed, in parallel with the channel, between the drain and the source, so that when an overcharge condition is detected for example, a charge current can still flow through the transistors. In normal operation, i.e. in the absence of overcharging or over-discharging, the two transistors are conductive.

Alternatively, using a bi-directional switch has also been proposed, formed of a single MOSFET transistor to perform this function. Examples of such a bi-directional switch are presented in U.S. Pat. Nos. 5,689,209 and 5,581,170. This solution is particularly advantageous since the transistor conduction resistance is divided in two compared to the solution using two power MOFSET transistors connected in anti-series. Moreover, the surface necessary to integrate such a bi-directional transistor is also less and consequently allows costs to be reduced.

In order to detect an overcharge, measuring a voltage drop across the terminals of measuring resistor, arranged in series with the battery in the path of the charge or discharge current, and interrupting the flow of the current when this voltage drop exceeds a predetermined value is for example proposed. This solution is however not very suitable, since it is generally desirable to limit the resistance present in series with the battery in the path of the current. Moreover, it is relatively difficult to accurately control the value of this resistance when it is made in an integrated way. This lack of precision then affects the value of the measured charge or discharge current.

A proposed alternative consists in measuring the voltage across the terminals of the current interruption means, this voltage being representative of the charge or discharge current which passes through them. When the voltage exceeds a determined reference voltage corresponding to a limit current value, the current interruption means are then activated in order to prevent the current flowing through the battery.

Since the current interruption means are typically made, as mentioned, by means of a pair of power MOFSET transistors mounted in anti-series or alternatively by means of a single MOFSET transistor, the voltage measured across their terminals is thus representative of the drain-source voltage $V_{DS}$ of the MOFSET transistor(s). For a given drain current $I_D$, i.e. for a given charge or discharge current, this voltage $V_{DS}$ is dependent in particular on the gate voltage $V_{GS}$ of the transistor. This voltage is also dependent on the transistor's own characteristics, in particular the threshold voltage and the gate oxide capacitance of the transistor. The voltage is also substantially dependent on the temperature.

Figure 1:
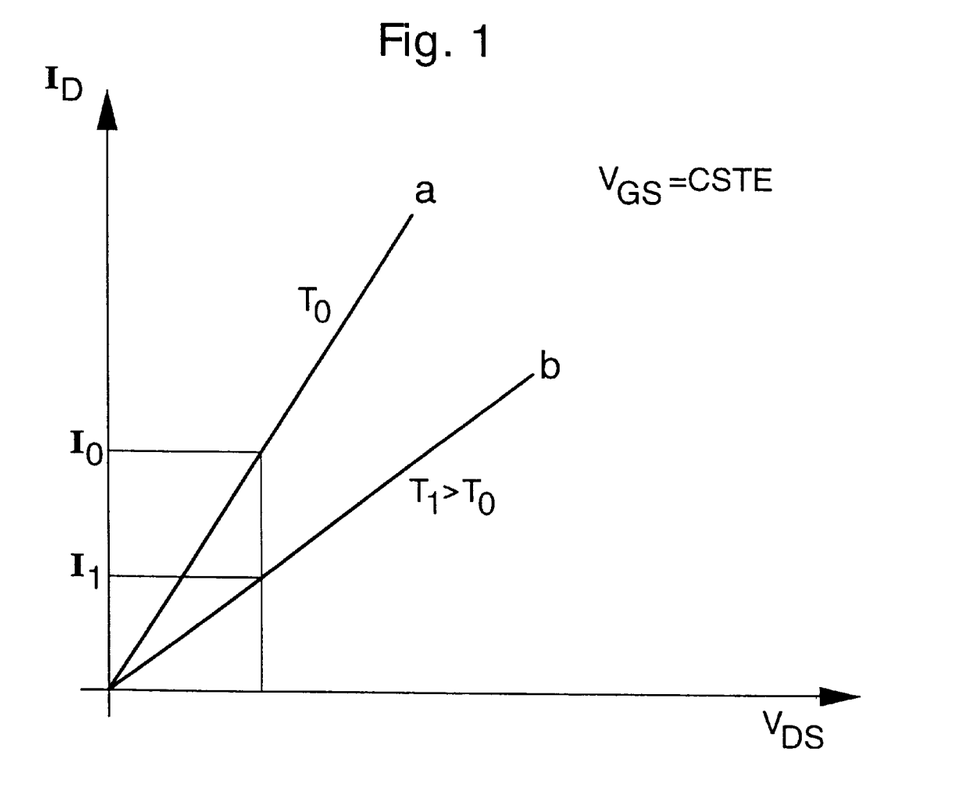
FIG. 1 is a diagram illustrating the output characteristics $I_D/V_{DS}$ of a MOFSET transistor in the characteristic linear zone for two distinct temperatures $T_0$ and $T_1$.

FIG. 1 shows a diagram of the output characteristics $I_D/V_S$ of an MOS transistor in its linear zone, i.e. for low drain-source voltage values $V_{DS}$ less than the transistor saturation voltage and for a given gate voltage value $V_{GS}$. Two curves a and b are illustrated in this Figure. Curve a illustrates the linear zone output characteristic of the transistor for a nominal temperature $T_0$. Following an increase in temperature to a higher temperature $T_1$, the transistor output characteristic, for the same gate voltage $V_{GS}$, as illustrated by curve b, tends to become lower. It will thus be noted that for a drain-source voltage value corresponding to given a drain current $I_0$, at nominal temperature $T_0$, this voltage is reached for a drain current $I_1$ less than current $I_0$ when the temperature increases to $T_1$. In other words, the measured voltage for a given current, for example equal to a current threshold $I_{PROT}$, increases with the temperature. Thus, if one chooses, as is typically the case, to fix a reference voltage $V_{REF}$ representative of this current threshold $I_{PROT}$ and to compare the measured voltage to this reference voltage, the real current value will differ according to the temperature.

Moreover, the reference voltage $V_{REF}$ may also vary substantially with the temperature. In particular reference voltage $V_{REF}$ can typically be more strongly temperature dependent than the voltage measured across the terminals of the interruption means. In such case, the effective current can exceed the current threshold defined by the reference voltage before the interruption means are activated to interrupt the current flow. Conversely, if the voltage measured across the terminals of the interruption means is more strongly temperature dependent than reference voltage $V_{REF}$, the interruption means are liable to interrupt the current flow while the latter is substantially less than the fixed current threshold.

SUMMARY OF THE INVENTION

An object of the present invention is thus to overcome these drawbacks and to provide a protective battery circuit wherein the temperature dependence of the measured voltage and/or the reference voltage, can be compensated.

The present invention concerns a protective battery circuit the features of which are defined in the appended claims.

As a result of these features, it is possible, in particular, to ensure that the charge or discharge current flowing through the battery does not exceed a determined current threshold, whatever the temperature.

BRIEF DESCRIPTION OF THE DRAWINGS

Other features and advantages of the invention will appear more clearly upon reading the following detailed description, made with reference to the annexed drawings given by way of non-limiting example and in which.

DETAILED DESCRIPTION OF THE INVENTION.

Figure 2:
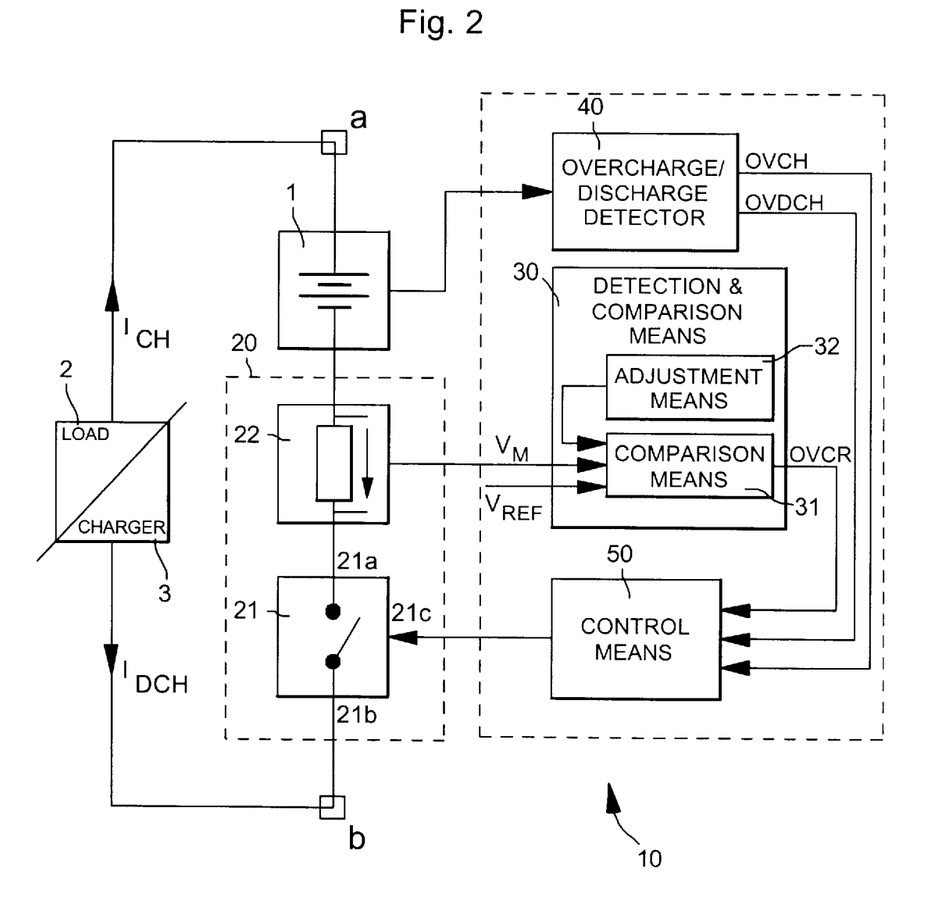
FIG. 2 is a simplified block diagram of the protective battery circuit according to the present invention.

With reference to FIG. 2, a protective battery circuit 10 according to the present invention, associated with a rechargeable battery 1, is illustrated schematically. Battery 1 and protective circuit 10 form an assembly including two terminals a and b across which a load 2 or a charger 3 can be connected. Current interruption means 21 are arranged in series with battery 1, across terminals a and b, so as to be able to interrupt, if necessary, the flow of the current through the latter. When a load 2 is connected across terminals a and b, a discharge current IDCH flows from the positive terminal of battery 1 via load 2 and interruption means 21 to the negative terminal of battery 1. When a charger 3 is connected across terminals a and b of the assembly, a charge current ICH flows in the opposite direction to discharge current IDCH.

In accordance with what was already mentioned in the preamble, interruption means 21 are adapted to conduct and, if necessary, to interrupt the current in a bi-directional manner, i.e. either during charging or discharging of battery 1. These interruption means 21 can thus be schematised like a switch including two terminals 21a and 21b forming a conduction path 21a–21b and a control terminal 21c allowing the current flow to be interrupted or not across its conduction terminals 21a and 21b.

Measuring means 22 are also connected in series with battery 1. These measuring means 22 are adapted to provide a measuring voltage $V_M$ representative of charge current $I_{CH}$ or discharge current $I_{DCH}$ flowing through the battery.

Preferably, as is schematised in FIG. 2 by the block indicated by the numerical reference 20, interruption means 21 also form measuring means 22. Measuring voltage $V_M$ is thus representative of the charge or discharge current flowing through interruption means 21.

Figure 3:
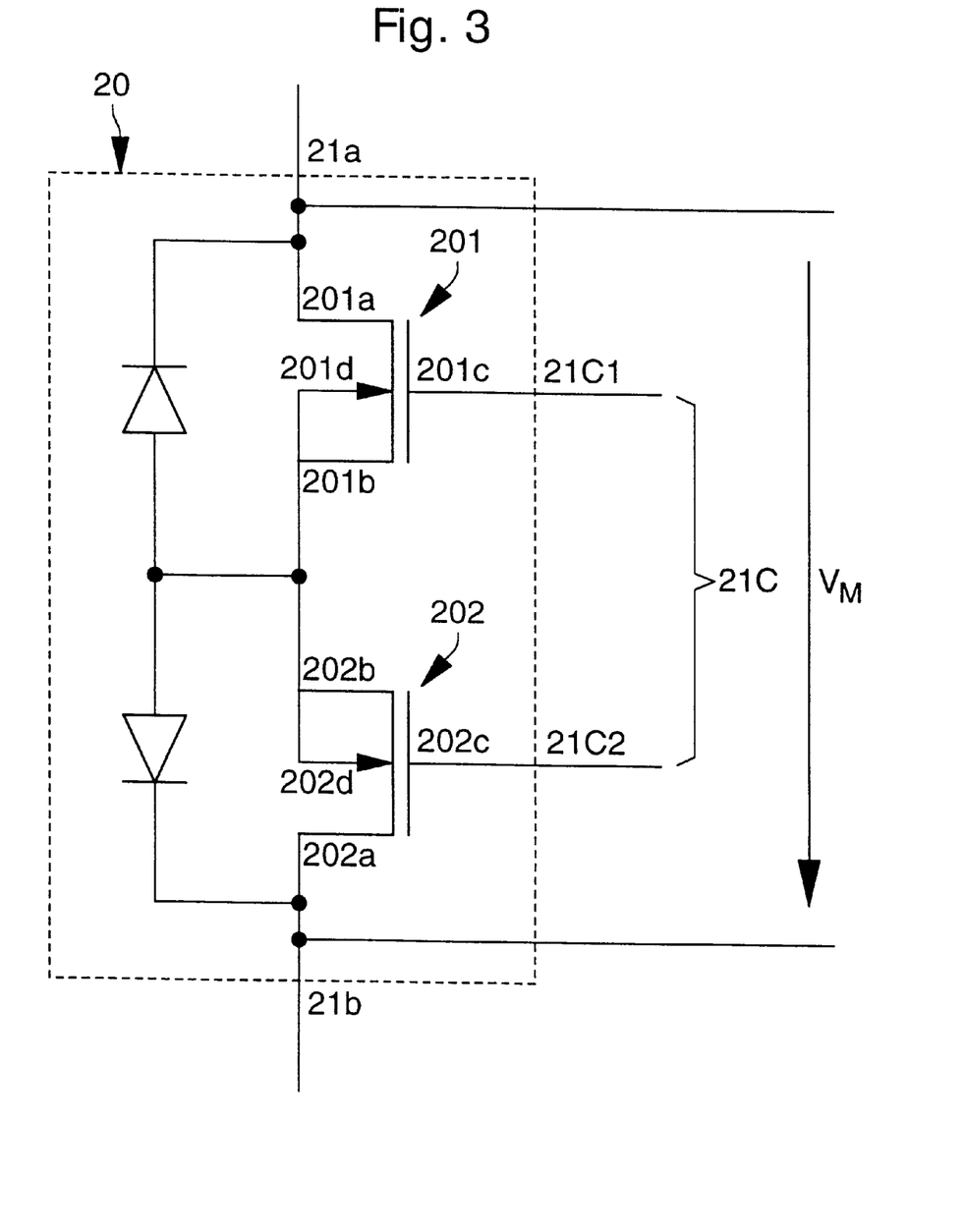
FIG. 3 is an embodiment example of the charge or discharge current interruption means.

FIG. 3 illustrates an embodiment example of means 20 including interruption means 21 and measuring means 22.

The latter thus include two MOFSET power transistors 201 and 202 connected in anti-series source to source. Sources 201b and 202b of these transistors are thus connected in common while drains 201a and 202a respectively form conduction terminals 21a and 21b of interruption means 21. Gates 201c and 202c of the transistors also form control terminals 21c1 and 21c2 of interruption means 21, globally indicated by the numerical reference 21c. Each power transistor is further characterised in that the source is connected to a body 201d and 202d respectively, so that a parasitic diode appears between the source and the drain.

In the example of FIG. 3, measuring voltage $V_M$ is thus defined across terminals 21a and 21b of the interruption means. This voltage thus corresponds, in the present case, to the sum of the drain-source voltages of transistors 201 and 202, but for the purpose of simplification, it may be assumed that means 20 behaves like a single MOFSET transistor. Moreover, according to whether a charge current $I_{CH}$ or discharge current $I_{DCH}$ is passing through means 20, measuring voltage $V_M$ is defined as the potential difference across terminals 21a and 21b or the potential difference across terminals 21b and 21a so that measuring voltage $V_M$ is always positive.

Referring again to FIG. 2, protective circuit 10 includes more particularly detection and comparison means 30 which detect whether or not charge current $I_{CH}$ or discharge current $I_{DCH}$ is greater than a determined current threshold $I_{PROT}$. These detection and comparison means 30 are thus adapted to receive measuring voltage $V_M$ from measuring means 22 and a reference voltage $V_{REF}$ typically generated by an internal voltage source which is not shown. This reference voltage $V_{REF}$ is representative of current threshold $I_{PROT}$; it is defined as the measuring voltage $V_M$ corresponding to a current equal to current threshold $I_{PROT}$ for a nominal temperature $T_0$.

Detection and comparison means 30 typically include means 31 for comparing measuring voltage $V_M$ and reference voltage $V_{REF}$ generating a control signal OVRC. Control signal OVRC is thus representative of charge current $I_{CH}$ or discharge current $V_{DCH}$ whether greater or not than determined current threshold $I_{PROT}$.

According to the present invention, in order to compensate for the temperature dependence of measuring voltage $V_M$ and/or reference voltage $V_{REF}$, detection and comparison means 30 further include adjustment means 32 for providing a compensation value allowing the temperature dependence of measuring voltage $V_M$ and/or $V_{REF}$ to be compensated. These adjustment means 32 will be described in more detail hereinafter.

Protective circuit 10 further typically includes means 40 for detecting overcharging and/or over-discharging of battery 1. These means are typically connected across the terminals of battery 1 so as to monitor the voltage level thereof, and generate, in response to a determined overcharging or over-discharging condition, an overcharge signal OVCH or over-discharge signal OVDCH. No further details will be given as to the making of means 40 for detecting an overcharge and/or over-discharge, since those skilled in the art are perfectly able to make such means in a suitable manner.

Protective circuit 10 further typically includes control means 50 connected to the control terminal(s) of interruption means 21, and receiving control signals OVCR, overcharge signals OVCH, and over-discharge signals OVDCH. These control means 50 are typically adapted to control interruption means 21 so as to interrupt the current flow through battery 1 in response to control signals OVCR, overcharge signals OVCH, and over-discharge signals OVDCH.

As was already mentioned in the preamble, measuring voltage $V_M$, for a given current, and reference voltage $V_{REF}$ can both exhibit temperature dependence. Consequently, a simple comparison between the measuring voltage and the reference voltage can result, according to the temperature, in an erroneous control signal OVCR, i.e. a control signal OVCR which does not correspond to a determined overcurrent condition.

Figure 4A:
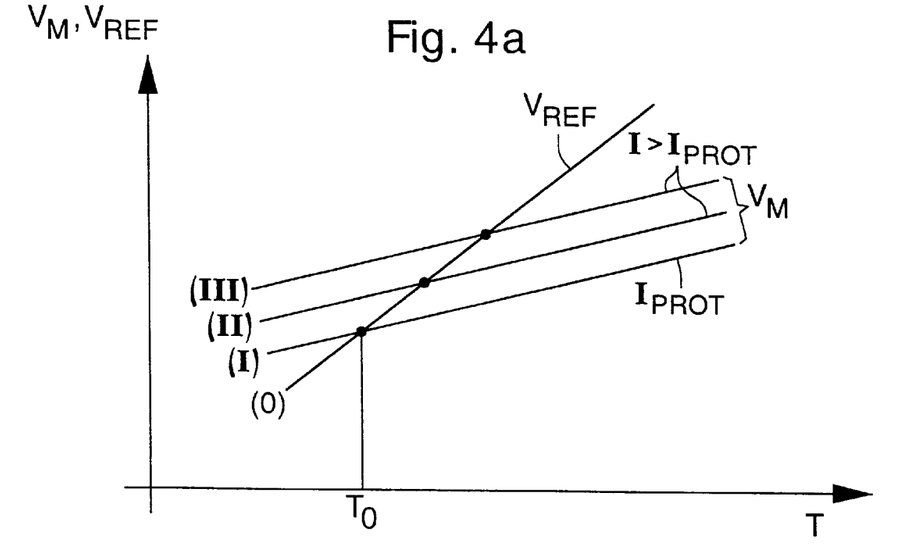
FIGS. 4a and 4b are diagrams illustrating two cases of the temperature dependence of reference voltage $V_{REF}$ and measuring voltage $V_M$.
Figure 4B:
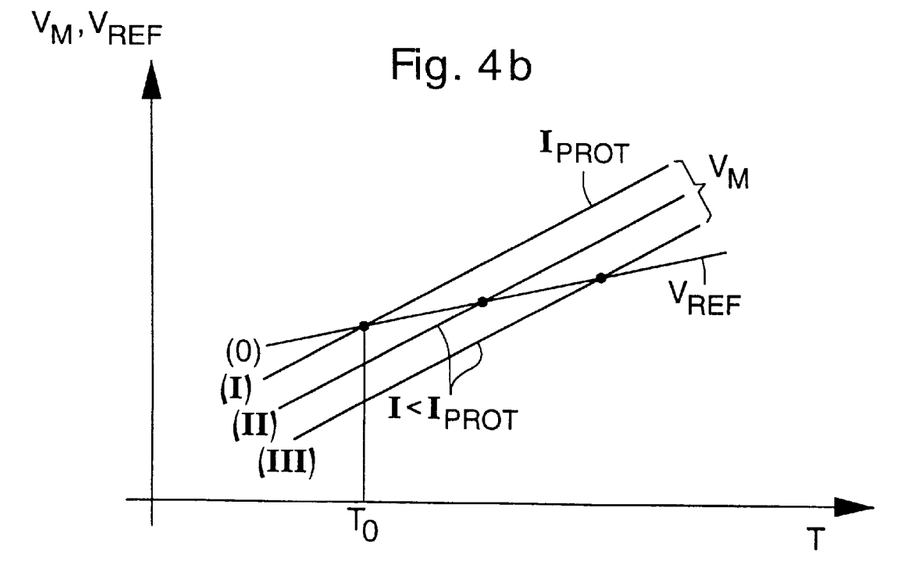

FIGS. 4a and 4b better illustrate the potential risk of a comparison, without temperature compensation, between measuring voltage $V_M$, for a given current, and reference voltage $V_{REF}$. FIGS. 4a and 4b thus show diagrams illustrating the evolution, as a function of the temperature and in the two cases essentially able to arise, of measuring voltage $V_M$, for a given charge current $I_{CH}$ or discharge current $I_{DCH}$, and reference voltage $V_{REF}$.

These Figures illustrate the temperature dependence of each of these voltages. It will be recalled that reference voltage $V_{REF}$ is defined, at a nominal temperature $T_0$, as the measuring voltage $V_M$ across the terminals of interruption means 21 corresponding to a charge current $I_{CH}$ or discharge current $I_{DCH}$ equal to current threshold $I_{PROT}$.

Each Figure illustrates a curve (o) representative of the evolution of reference voltage $V_{REF}$ and three curves (i) to (iii) representative of the evolution of measuring voltage $V_M$ for three different currents, curve (i) being representative, in both Figures, of measuring voltage $V_M$ for a current equivalent to current threshold $I_{PROT}$. It has been assumed here that the evolution curves (o) and (i) to (iii) are substantially linear and typically have a positive temperature coefficient, i.e. a voltage increasing with the temperature.

FIG. 4a illustrates a first case wherein reference voltage $V_{REF}$ is more substantially temperature dependent than measuring voltage $V_M$ for a given current. Curves (i) and (iii) are representative of two measuring voltages $V_M$ for two currents greater than current threshold $I_{PROT}$. It will thus be noted that, for a nominal temperature $T_0$, measuring voltage $V_M$ corresponds to reference voltage $V_{REF}$ for a current equal to $I_{PROT}$ (curve (i)), this equivalence, for temperatures which are increasing, is achieved for measuring voltages $V_M$ corresponding to drain currents which are also increasing (curves (ii) and (iii)). It is of course undesirable for the real current threshold to evolve so that it increases with the temperature.

FIG. 4b illustrates a second case wherein reference voltage $V_{REF}$ is less substantially temperature dependent than measuring voltage $V_M$ for a given current. Curves (ii) and (iii) are representative of two measuring voltages $V_M$ corresponding to two currents less than current threshold $I_{PROT}$. In this case, it can thus be seen that for temperatures which are increasing, the equivalence between measuring voltage $V_M$ and reference voltage $V_{REF}$ is achieved for measuring voltages corresponding to drain currents which are decreasing (curves (ii) and (iii)). This case appears more favourable than the preceding one, but it is nonetheless desirable to prevent the real current threshold decreasing too much when the temperature increases in order to avoid unnecessarily cutting off the flow of current in the battery.

Analytically, the temperature dependence of reference voltage $V_{REF}$ and measuring voltage $V_M$ for a given current equal to current threshold $I_{PROT}$, can be expressed as follows:

$$\Delta V = V_{REF} - V_M = \kappa(T - T_0) \quad (1)$$

where $\kappa$ is a defined positive or negative temperature dependence factor according to the case being considered, i.e. the case presented with reference to FIG. 4a or the case presented with reference to FIG. 4b. This temperature dependence factor $\kappa$ is determined by a first temperature dependence of measuring voltage $V_M$ and a second temperature dependence of reference voltage $V_{REF}$.

According to the present invention, detection and comparison means 30 are adapted to compensate the temperature dependence of measuring means $V_M$ and reference means $V_{REF}$. Detection and comparison means 30 therefore include adjustment means 32 for generating a determined compensation value and allowing the temperature dependence of measuring voltage $V_M$ and reference voltage $V_{REF}$ to be compensated.

Diode-connected bipolar transistors are preferably used to make adjustment means 32, i.e. bipolar transistors whose base and collector are connected to each other. It is known that the voltage $V_D$ across the terminals of a diode formed by the base-emitter junction of a bipolar transistor follows a substantially linear evolution as a function of the temperature and advantageously has a negative temperature coefficient, i.e. it decreases in a linear manner when the temperature increases. When the temperature tends towards 0° K., this diode voltage tends towards a value $V_{BG}$ called the bandgap value. In the case of silicon, this bandgap value is equal to approximately 1,205 volts. This diode voltage $V_D$ is substantially equal to:

$$V_D = V_{BG} - kT/e \, \ln(I_0/I) \quad (2)$$

where k is the Boltzman constant, and the electron charge and $I_0$ a value dependent in particular on the surface area of the device and equivalent concentrations of the conduction and valence states of the doped material.

Value $I_0$ is much greater than that of current I which passes through the diode; although it depends on the manufacturing technology of the transistor and also on the temperature, it may be assumed that the factor $\ln(I_0/I)$ remains substantially for a given current I.

If two different currents $I_1$ and $I_2$ are successively passed in the same diode at the same temperature, the difference $\Delta V_{21}$ between voltages $V_2$ and $V_1$ which appear at its terminals is equal to:

$$\Delta V_{21} = V_2 - V_1 = kT/e \, \ln(I_2/I_1) \quad (3)$$

This difference is directly dependent on the temperature and has a positive or negative temperature coefficient according to whether current $I_2$ is greater than or less than current $I_1$.

Moreover, by adding a voltage proportional to this difference to a diode voltage $V_3$ generated by the passing of a current $I_3$, for a same temperature, one obtains:

$$V_3 + \gamma \Delta V_{21} = V_{BG} - kT/e(\ln(I_0/I_3) - \gamma \ln(I_2/I_1)) \quad (4)$$

By a suitable choice of the proportionality coefficient $\gamma$ such that:

$$\ln(I_0/I_3) - \gamma \ln(I_2/I_1) = 0 \quad (5)$$

the quantity $V3 + \gamma \Delta V_{21}$ can thus be made independent of the temperature and is thus equal to bandgap value $V_{BG}$.

Thus by adding a voltage proportional to the difference $\Delta V_{21}$ between two diode voltages as well as a voltage proportional to bandgap value $V_{BG}$ to the difference $\Delta V$ between reference voltage $V_{REF}$ and measuring voltage $V_M$ as expressed in (1), one obtains:

$$\Delta V + \alpha \Delta V_{21} + \beta V_{BG} = (\kappa + \alpha k/e \ln(I_2/I_1))T + \beta V_{BG} - \kappa T_0 \quad (6)$$

By a suitable choice of proportionality coefficients α and β so that:

$$\kappa + \alpha k/e \ln(I_2/I_1) = 0 \text{ et } \beta V_{BG} - \kappa T_0 = 0 \quad (7)$$

the temperature dependence of measuring voltage $V_M$ and reference voltage $V_{REF}$ can be entirely compensated. In other words, the quantity $\Delta V + \alpha \Delta V_{21} + \beta V_{BG}$ can be made independent of the temperature. This quantity will thus be made zero whatever the temperature for a measuring voltage $V_M$ corresponding to a charge or discharge current equivalent to $I_{PROT}$.

Figure 5:
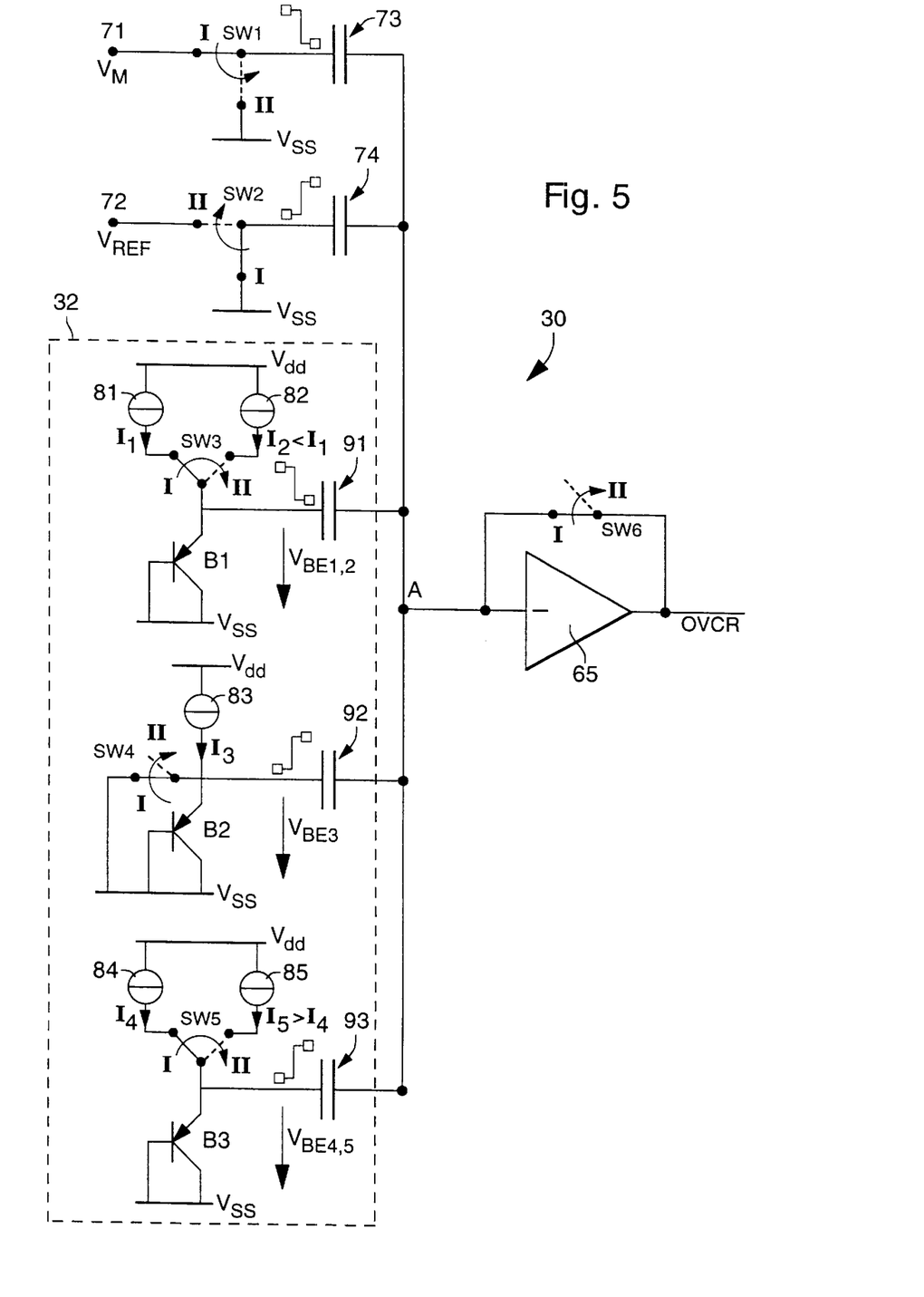
FIG. 5 is an embodiment example of the comparison means of the protective battery circuit according to the present invention.

FIG. 5 shows an embodiment example of detection and comparison means 30 allowing the principles which have just been stated for the case presented with reference to FIG. 4a, i.e. in the case where reference voltage $V_{REF}$ is more substantially temperature dependent than measuring voltage $V_M$ for a given current to be implemented.

Detection and comparison means 30 thus include two inputs 71 and 72 to which are respectively applied measuring voltage $V_M$ and reference voltage $V_{REF}$. Two capacitive elements 73 and 74 are respectively arranged on these inputs 71 and 72. These capacitive elements 73 and 74 are respectively adapted to be connected respectively to inputs 71 and 72 of the circuit via a switch SW1 and a switch SW2. When switches SW1 and SW2 are positioned at "I", as is indicated by full lines, capacitive elements 73 and 74 are respectively connected to input 71 to which measuring voltage $V_M$ is applied and to a supply terminal of the circuit to which a potential Vss defining the earth (zero potential) of the detection circuit is applied. When they are positioned at "II" as is indicated in dotted lines, capacitive elements 73 and 74 are then respectively connected to earth and to input 72 to which reference voltage $V_{REF}$ is applied. Alternatively, it will be noted that it is possible to use only one capacitive element and one switch adapted to switch successively between input terminals 71, in position "I" and 72, in position "II".

The other terminals of capacitive elements 73, 74 are together connected to a node A at the inverter input of a very high gain amplifier 65. A switch SW6 allows the output of amplifier 65 to be connected or disconnected from its input. The respective capacitances of capacitive elements 73 and 74 are selected to be equal (capacitance C) so that measuring voltage $V_M$ and reference voltage $V_{REF}$ are directly compared.

According to the present invention, detection and comparison means 30 include adjustment means, indicated globally by the reference 32 to generate a temperature dependent compensation value and allowing the temperature dependence of measuring voltage $V_M$ and reference voltage $V_{REF}$ to be compensated.

These adjustment means 32 for generating the compensation value include, in the example of FIG. 5, three diode-connected bipolar transistors B1, B2, B3 of the PNP type. These three bipolar transistors are connected via their collector and their base to the detection circuit earth.

First and second current sources 81 and 82 respectively generating currents $I_1$ and $I_2$ are arranged between the emitter of transistor B1 and a supply terminal of the circuit to which a potential Vdd is applied. These current sources 81 and 82 are selectively connected to the emitter of transistor B1 by means of a switch SW3 so that currents $I_1$ or $I_2$ selectively pass through the base-emitter junction of the transistor when switch SW3 is in position "I" or in position "II". As a consequence diode voltages $V_{BE1}$ and $V_{BE2}$ are selectively generated. In this example, current $I_2$ is defined so that it is less than current $I_1$, diode voltage $V_{BE2}$ being thus less than diode voltage $V_{BE1}$.

A third current source 83 is arranged between the emitter of transistor B2 and the supply terminal of the circuit to which potential Vdd is applied. This current source 83 maintains a constant current 13 through the base-emitter junction of transistor B2. A switch SW4 is further arranged between the emitter of transistor B2 and the circuit's earth. When this switch SW4 is in position "I", indicated by the full lines, the emitter of transistor B2 is thus connected to the circuit's earth. In the contrary case, when the switch is in position "II", indicated by the dotted lines, current 13 passes through the base-emitter junction and a diode voltage $V_{BE3}$ is thus generated.

Fourth and fifth current sources 84 and 85 generating respectively currents $I_4$ and $I_5$ are further arranged between the terminal Vdd of the circuit and the emitter of transistor B3. These current sources 84 and 85 are selectively connected to the emitter of transistor B3 by means of a switch SW5 so that currents $I_4$ or $I_5$ selectively pass through the transistor base-emitter junction when switch SW5 is in position "I" and "II" respectively. Consequently, diode voltages $V_{BE4}$ and $V_{BE5}$ are selectively generated. In this example, current $I_4$ is defined so that it is less than current $I_5$, diode voltage $V_{BE4}$ thus being less than diode voltage $V_{BE5}$.

Three capacitive elements 91, 92 and 93 are further respectively connected by one of their terminals to the emitters of transistors B1, B2 and B3, the other terminals of these capacitive elements 91, 92 and 93 being connected to input node A of amplifier 65.

The respective capacitances $C_1$ and $C_2$ of capacitive elements 91 and 92 are such that the ratio $C_1/C$ and $C_2/C$ (where C is the capacitance of capacitive elements 73 and 74) are very substantially equal to proportionality coefficient α and β, respectively, defined according to equations (6) and (7) above. Capacitance C3 of capacitive element 93 is such that the ratio $C_3/C_2$ is very substantially equal to proportionality coefficient γ defined in accordance with equations (4) and (5) above.

During a first phase, switches SWI to SW6 are placed in position "I" indicated in full lines in the Figure. Amplifier 65 is then subjected to a total counter-reaction and automatically polarises at a stable operating point, its input voltage $V_E$ being then equal to its output voltage and its maximum gain. Capacitive elements 73, 74 and 91, 92, 93 are thus respectively charged at voltages $(V_E-V_M)$, $V_E$, $(V_E-V_{BE1})$, $V_E$ and $(V_E-V_{BE4})$.

In a second phase, when switches SW1 to SW6 are placed in position "II" indicated in dotted lines in the Figure, capacitive elements 73, 74 and 91, 92 93 inject into input node A of amplifier 65, left floating, electric charges respectively equal to C $V_M$, C $V_{REF}$, αC $(V_{BE2}-V_{BE1})$, βC $V_{BE3}$, and βγC $(V_{BE5}-V_{BE4})$, the charges injected by capacitive elements 73 and 91 being of the opposite sign to the other charges in this case.

The total sum of the charges injected by capacitive elements 73, 74 and 91, 92, 93 into input node A of amplifier 65 is thus representative of the equation (6) above and equal to:

$$C(V_{REF}-V_M+\alpha(V_{BE2}-V_{BE1})+\beta(V_{BE3}+\gamma(V_{BE5}-V_{BE4}))) \quad (8)$$

where proportionality coefficients α, β and γ are such that, in accordance with equations (5) and (7):

$$\kappa + \alpha k/e \ln(I_2/I_1) = 0, \beta V_{BG} - \kappa T_0 = 0, \ln(I_0/I_3) - \gamma \ln(I_5/I_4) = 0 \quad (9)$$

where κ is defined as the temperature dependence factor which is defined positive in this case and determined by the temperature dependence of reference voltage $V_{REF}$ and measuring voltage $V_M$ for a given current equal to current threshold $I_{PROT}$ (equation (1) above).

For a charge current $I_{CH}$ or discharge current $I_{DCH}$ equivalent to current threshold $I_{PROT}$, the total sum of the charges injected into input node A of amplifier 65 thus become zero, whatever the temperature and no signal appears at the input of amplifier 65.

Conversely, if the charge or discharge current is different from current threshold $I_{PROT}$, i.e. if measuring voltage $V_M$ is different from reference voltage $V_M$ corresponding to a current equivalent to $I_{PROT}$, a voltage variation appears at the input of amplifier 65 the polarity of which is representative of the sign of the total charge injected into input node A. This signal is amplified and inverted by amplifier 65 which supplies an output signal of much greater amplitude than that of the signal applied to its input. This output signal of amplifier 65, of logic level, can thus be used as the control signal OVCR in order to control interruption means 21 and to interrupt, if necessary, the flow of charge current $I_{CH}$ or discharge current $I_{DCH}$.

Preferably, as can be understood from the foregoing, one will seek to substantially cancel out the temperature dependence of measuring voltage $V_M$ and reference voltage $V_{REF}$, so that charge current $I_{CH}$ or discharge current $I_{DCH}$ cannot exceed the defined current threshold $I_{PROT}$. In such a case, control signal OVCR generated by detection and comparison means 30 will thus be temperature independent.

It may however be envisaged, within the scope of the present invention, to compensate the temperature dependence of measuring voltage $V_M$ and reference voltage $V_{REF}$ so that the effective current limit evolves slightly negatively with the temperature. It may in fact be preferable to ensure that one falls within the case presented above with reference to FIG. 4b so that the effective current threshold never evolves positively with the temperature. In such a case, control signal OVCR generated by detection and comparison means 30 will thus have a negative temperature coefficient.

It will thus be noted that the protection circuit according to the invention advantageously offers a high level of flexibility of adjustment. It will further be noted from the foregoing that the circuit according to the present invention has the advantage of being able to compensate easily and accurately the temperature dependence of reference voltage $V_{REF}$ and measuring voltage $V_M$, for a given current. It is for example very easy with MOS technology to achieve very precise capacitance ratios for the capacitive elements.

The circuit according to the present invention also operates very quickly, the time necessary for calculation and comparison being essentially dedicated to the phase of charging the capacitive elements and polarising the amplifier.

Moreover, amplifier 65 is used only to amplify the signal appearing at input node A sufficiently so that control signal OVCR can correctly drive control means 50 of interruption means 21. One can thus simply use a single stage amplifier, in the manner of an inverter, with two complementary transistors mounted with a common source whose drains are connected to each other.

It may also be noted from the foregoing that it is not actually necessary to generate the three voltages $V_{BE3}$, $V_{BE4}$ and $V_{BE5}$, two voltages being sufficient. It is thus possible to omit transistor B2, and to use as voltage $V_{BE3}$, voltage $V_{BE5}$ generated by transistor B3 during the second phase. In such case, capacitive element 92 can be connected, via a switch, first to the circuit's earth during the first phase, then, during the second phase, to the emitter of transistor B3.

What is claimed is:

1. A protective circuit for protecting a rechargeable battery through which a charge or discharge current can flow, this protective circuit including:

measuring means adapted to be connected in series with said battery and to provide a measuring voltage representative of said current, said measuring voltage being able to have a first temperature dependence;

detection and comparison means adapted to receive said measuring voltage and a reference voltage and to generate a control signal in response to a comparison of said reference and measuring voltages, said reference voltage being able to have a second temperature dependence; and interruption means adapted to control the flow of said current through said battery in response to said control signal, wherein said detection and comparison means include adjustment means for compensating said first temperature dependence of the measuring voltage and/or said second temperature dependence of the reference voltage, said detection and comparison means including:
means for generating first, second, third, fourth and fifth diode voltages, and
calculating means including capacitive elements and switching elements to connect selectively and sequentially, during a first and a second phase, said capacitive elements to said means for generating said diode voltages and to terminals to which are applied said measuring voltage and said reference voltage, so that said calculating means generate said control signal during said second phase, said adjustment means generating a compensation value defined from the sum:
of the product of the difference between said first and second diode voltages by a first determined coefficient, and
of the product, by a second determined coefficient, of the sum of said third diode voltage and the product of the difference between said fourth and fifth diode voltages by a third determined coefficient, said control signal being representative of the sum of the difference between said reference voltage and said measuring voltage, and of said compensation value.

2. The protective circuit according to claim 1, wherein said adjustment means are arranged so that said generated control signal is substantially temperature independent.

3. The protective circuit according to claim 1, wherein said adjustment means are arranged so that said generated control signal has a negative temperature coefficient.

4. The protective circuit according to claim 1, wherein said interruption means also form said measuring means, said measuring voltage being thus representative of the current passing through said interruption means.

5. The protective circuit according to claim 1, wherein said calculating means include first, second, third, fourth and fifth capacitive elements each having a first terminal connected to a summing node, said first and second capacitive elements having substantially equal capacitances, said third capacitive element having a capacitance which is substantially equal to the product of the capacitance of said first capacitive element by said first determined coefficient, said fourth capacitive element having a capacitance which is substantially equal to the product of the capacitance of said first capacitive element by said second determined coefficient, said fifth capacitive element having a capacitance which is substantially equal to the product of the capacitance of said first capacitive element by said second and third determined coefficients, and wherein said calculating means further include first, second, third, fourth and fifth switching elements respectively connected to said first, second, third, fourth and fifth capacitive elements, said first switching element being adapted to selectively connect a second terminal of said first capacitive element to said measuring voltage during said first phase and to a determined potential during said second phase, said second switching element being adapted to selectively connect a second terminal of said second capacitive element to said determined potential during said first phase and to said reference voltage during said second phase, said third switching element being adapted to selectively connect a second terminal of said third capacitive element to said first diode voltage during said first phase and to said second diode voltage during said second phase, said fourth switching element being adapted to selectively connect a second terminal of said fourth capacitive element to said determined potential during said first phase and to said third diode voltage during said second phase, and said fifth switching element being adapted to selectively connect a second terminal of said fifth capacitive element to said fourth diode voltage during said first phase and to said fifth diode voltage during said second phase.

6. The protective circuit according to claim 5, wherein said means for generating said diode voltages include three bipolar transistors whose base is connected to the collector, a first of said transistors being connected successively in series with first and second current sources, the emitter of said first bipolar transistor being connected to the second terminal of said third capacitive element, a second of said transistors being connected in series with a third current source, the emitter of said second bipolar transistor being connected to the second terminal of said fourth capacitive element, and a third of said transistors being connected successively in series with fourth and fifth current sources, the emitter of said third bipolar transistor being connected to the second terminal of said fifth capacitive element.

7. The protective circuit according to claim 5, wherein said third and fifth diode voltages are equal and wherein said means for generating said diode voltages include two bipolar transistors whose base is connected to the collector, a first of said transistors being connected successively in series with first and second current sources, the emitter of said first bipolar transistor being connected to the second terminal of said third capacitive element, and a second of said transistors being connected successively in series with third and fourth current sources, the emitter of said second bipolar transistor being connected to the second terminal of said fifth capacitive element, the second terminal of said fourth capacitive element being connected to the emitter of said second bipolar transistor during said second phase.

8. The protective circuit according to claim 5, wherein said calculating means further include an amplifier having an input connected to said summing node and a sixth switching element for selectively connecting an output of said amplifier to said summing node during said first phase and for disconnecting said output from said summing node during said second phase.

9. The protective circuit according to claim 1, wherein said interruption means are formed of a pair of MOFSET power transistors connected in anti-series source to source, one or the other of the transistors being cut off to interrupt the flow of said current.

10. The protective circuit according to claim 1, wherein said interruption means are formed of a pair of MOFSET power transistors connected in anti-series drain to drain, one or the other of the transistors being cut off to interrupt the flow of said current.

11. The protective circuit according to claim 1, wherein said means for generating said diode voltages include bipolar transistors which are connected in series with current sources and whose base is connected to the collector.

12. A method for generating a control signal for interrupting the flow of a charge or discharge current through a rechargeable battery, said method comprising the steps of:

providing a measuring voltage which is representative of said charge or discharge current flowing through said rechargeable battery;

comparing said measuring voltage with a reference voltage; and producing said control signal in response to the comparison of said measuring voltage and said reference voltage, wherein said step of comparing the measuring voltage with the reference voltage further comprises the step of adding a compensation value for compensating a temperature dependence of said measuring voltage and/or a temperature dependence of said reference voltage, said compensation value being defined from the sum:
  of the product of the difference between first and second diode voltages by a first determined coefficient, and
  of the product, by a second determined coefficient, of the sum of a third diode voltage and the product of the difference between fourth and fifth diode voltages by a third determined coefficient.

13. The method of claim 12, wherein the generated control signal is substantially temperature independent.

14. The method of claim 12, wherein the generated control signal has a negative temperature coefficient.

15. The method of claim 12, wherein said third diode voltage is selected to be equal to said fourth or fifth diode voltage.

* * * * *